Aug. 22, 1939.   J. A. MONTGOMERY   2,170,569
CUTTING SCREEN FOR SEWAGE
Filed March 17, 1936   2 Sheets-Sheet 1
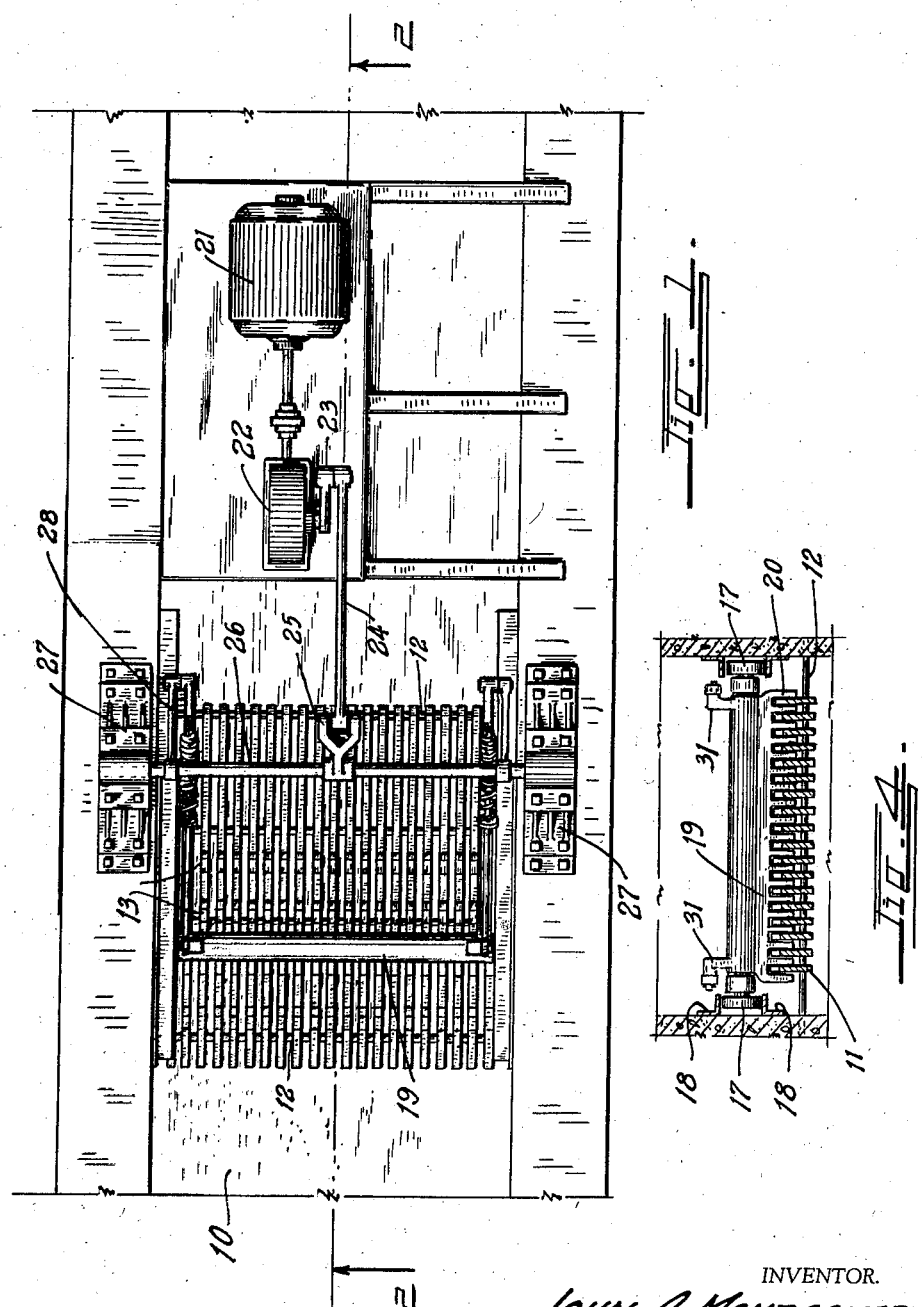
INVENTOR.
John A. Montgomery
BY
ATTORNEY.

Aug. 22, 1939.   J. A. MONTGOMERY   2,170,569
CUTTING SCREEN FOR SEWAGE
Filed March 17, 1936   2 Sheets-Sheet 2
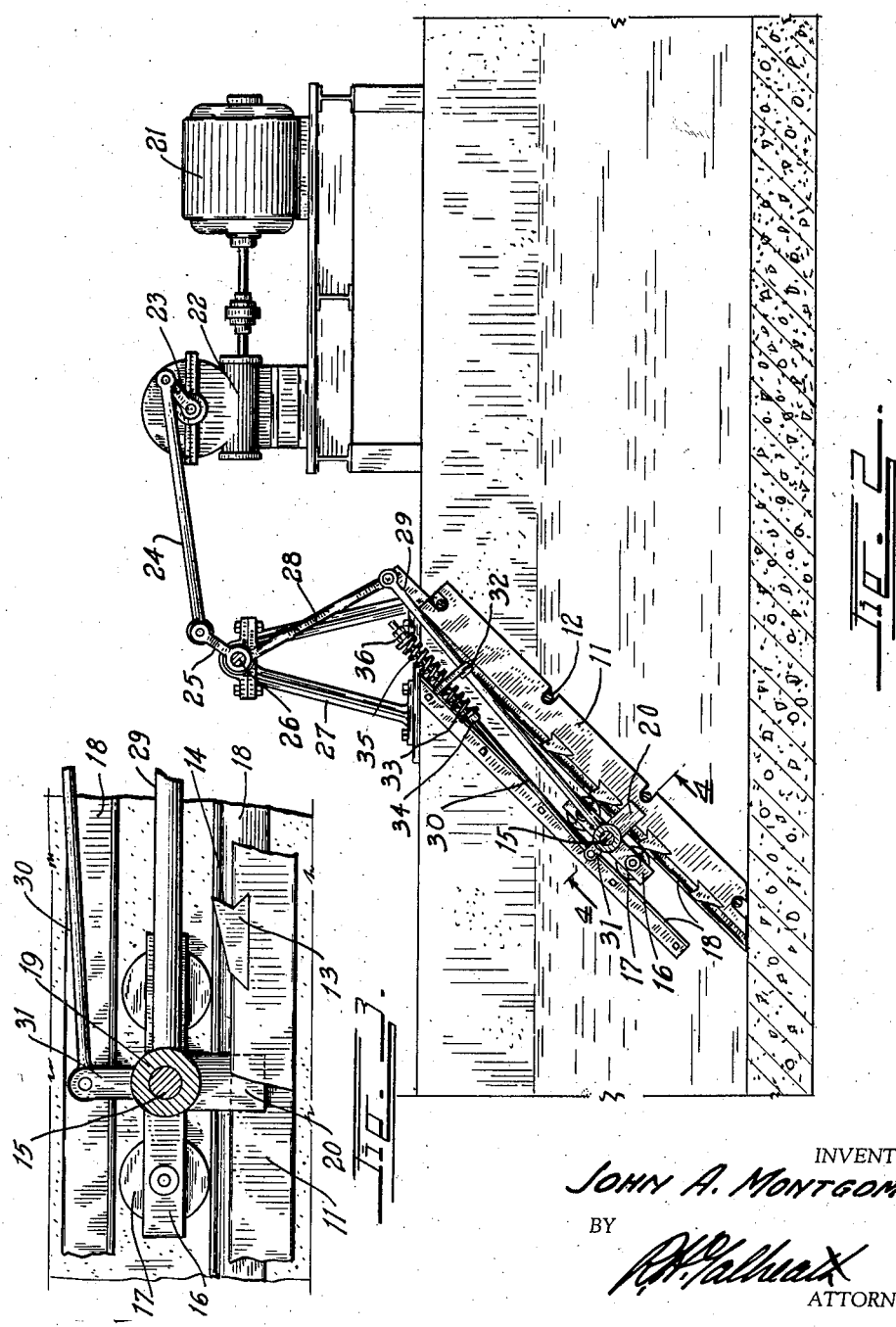
INVENTOR.
JOHN A. MONTGOMERY
BY
ATTORNEY.

Patented Aug. 22, 1939

2,170,569

UNITED STATES PATENT OFFICE 2,170,569

CUTTING SCREEN FOR SEWAGE

John Arthur Montgomery, Denver, Colo.

Application March 17, 1936, Serial No. 69,356

5 Claims. (Cl. 210—176)

This invention relates to a device for cutting, chopping and masticating solid materials in sewage, and has for its principal object the provision of a mechanism which will catch solid materials in flowing sewage, chop the materials into small particles, and again release the chopped particles to the flowing sewage.

Another object of the invention is to so construct the device that should rocks, metallic objects or other hard substances be caught in the device, the masticating or cutting mechanism will automatically release and act to remove these objects or substances from the flow.

Other objects and advantages reside in the detail construction of the invention, which is designed for simplicity, economy, and efficiency. These will become more apparent from the following description.

In the following detailed description of the invention reference is had to the accompanying drawing which form a part hereof. Like numerals refer to like parts in all views of the drawings and throughout the description.

In the drawings:

Fig. 1 is a plan view illustrating the invention in place in a sewage conduit or trough.

Fig. 2 is a longitudinal section through the invention, taken on the line 2—2, Fig. 1.

Fig. 3 is an enlarged detail view illustrating the cutting portion of the device.

Fig. 4 is a cross section, taken on the line 4—4, Fig. 2.

As illustrated, a sewerage ditch or trough is indicated at 10. A series of inclined, removable, parallel, spaced-apart screen bars 11 are supported in the trough 10 upon suitable supporting rods 12. Each of the bars 11 carries a series of spaced-apart hardened cutting teeth 13. The bar teeth 13 are preferably of dove-tailed construction, and are forced into dove-tailed mortises in the bars, as shown in Fig. 3. This construction holds them firmly in position, yet allows them to be driven from place and replaced when necessary. The teeth 13 are each provided with upper cutting edges 14.

The teeth 13 are aligned horizontally, across the series of bars 11 as shown in Fig. 1. A reciprocating shaft 15 is suspended across the bars between wheel frames 16 positioned at each side of the trough 10. The wheel frames 16 are provided with suitable rollers 17 which travel between inclined track members 18 which may be attached directly to the walls of the trough 10.

A rake member 19 formed with a tubular sleeve portion which slips over the shaft 15 is rotatably mounted upon this shaft. The rake member 19 is formed with a series of flat rake teeth 20, there being one tooth positioned between each pair of the bars 11. The rake teeth are of a width to fit snugly, yet slidably between the bar teeth 13.

The rake may be reciprocated longitudinally of the bars 10 by any suitable mechanism. One mechanism for reciprocating the rake is illustrated in the drawings, and comprises a motor 21 connected through a speed reducer 22 to operate a crank 23. The rotation of the crank 23 is imparted, through a connecting rod 24, to reciprocate a second crank 25 secured upon a horizontal crank shaft 26. The crank shaft 26 is supported in suitable bearing brackets 27 above and across the trough 10. Each of these lever arms is connected by means of a draw bar 29 with one extremity of the shaft 15.

It can be readily seen that rotation of the crank 23 will rock the crank shaft 26 back and forth. The rocking of this shaft is converted into reciprocatory movement of the rake shaft 15 by the lever arms 28 and the draw bars 29.

The rake teeth 20 are held resiliently perpendicular to the bars 11 by means of spring rods 30 connected to upwardly projecting lugs 31 at each extremity of the rake member 19. The spring rods 30 extend through brackets 32, there being one bracket mounted on each of the draw bars 29. A comparatively light compression spring 33 is positioned about each of the spring rods 30 below the brackets 32 and against a set collar 34. A second comparatively heavy spring 35 in mounted about the spring rods 30 above each of the brackets 32. The compression in the springs 33 and 35 and the angle of the rake teeth can be regulated by means of suitable lock nuts 36.

Operation

The bars 11 catch and hold all solid material which is too large or too rigid to pass through the spaces between the bars and also all tenacious flexible material which tends to wrap about the bars. The descending rake teeth 20, as they pass between the cutting edges 14 of the teeth 13, act to shear this material into short sections or pieces. These small cut pieces will then flow with the sewage through the spaces between the bars 11.

The springs 33 may be made sufficiently light to allow the rake teeth to swing over all material on the up stroke so that all cutting will be done on the down stroke, if desired, or the device may cut on both the up and down strokes. Should it happen that solid material which might damage the teeth be encountered on the down stroke, such as wires, cans, nails, sticks, stones etc. the pressure against the teeth will cause them to compress the heavy springs 35 so that the rake teeth will swing and pass downwardly over this material without cutting it.

The bar screen may be placed either horizontally or vertically. In the drawings accompanying the specification, they have been shown vertically. The teeth on the movable rake may be either fixed or movable, and may be replaced by either rotating or semi-rotating blades rather than the rigid construction illustrated.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A device for cutting solid material in sewage comprising: a series of parallel screen bars; bar teeth projecting from the upstream edges of said bars; a rake member; teeth on said rake member positioned to project between said bars; and means for positively forcing said rake member alternately upward and downward so as to cause said rake teeth to coact with said bar teeth to cut material against said bar teeth.

2. A device for cutting solid material in sewage comprising: a series of parallel screen bars; bar teeth projecting from the upstream edges of said bars; a rake member; teeth on said rake member positioned to project between said bars; means for positively forcing said rake member alternately upward and downward so as to cause said rake teeth to coact with said bar teeth to cut material against said bar teeth; and means for yieldably mounting said rake teeth so that they may pass over solid obstructions upon the downward movement of said rake members.

3. A device for cutting solid material in sewage comprising: a series of parallel screen bars; bar teeth projecting from the upstream edges of said bars; a rake member; teeth on said rake member positioned to project between said bars; and means for positively forcing said rake member alternately upward and downward so as to cause said rake teeth to coact with said bar teeth to cut material against said bar teeth; and resilient means for holding said rake teeth in the extended position so that they may swing on contacting excessive resistance.

4. Means for cutting solid material in flowing sewage comprising: a trough for receiving the flow of said sewage; inclined parallel screen bars positioned in said trough; cutting teeth projecting from the upstream edges of said screen bars; inclined guides at each side of said trough; a rake extending between said guides ahead of said screen bars; teeth on said rake projecting between said screen bars; means for positively reciprocating said rake alternately upward and downward so as to cause said rake teeth to cooperate with said cutting teeth to shear material therebetween; a lug extending upwardly from said rake member; a spring rod actuated by said lug; and springs resisting the movement of said spring rod in either direction so that said rake teeth may ride over obstructions upon either the upward or the downward movement when necessary.

5. A cutting screen for sewage comprising: an inclined series of parallel vertically extending bars; ratchet-like teeth projecting from the upstream edges of said bars, said teeth having their upper faces positioned substantially at right angles to said bars and their lower faces inclined to the surface of said bars; a rake shaft extending laterally across the upstream face of said bars; teeth projecting from said shaft between said bars; and means for positively reciprocating said shaft upward and downward along said bars to cause said teeth to drag debris over the inclined faces of said teeth to the upper faces thereof where it will be retained during the downstroke of said shaft so as to be comminuted by the downward passage of said teeth.

JOHN ARTHUR MONTGOMERY.